Jan. 3, 1933. J. W. HEINEY 1,892,668
ROLLING SPRING SHACKLE
Filed Aug. 26, 1931 2 Sheets-Sheet 1
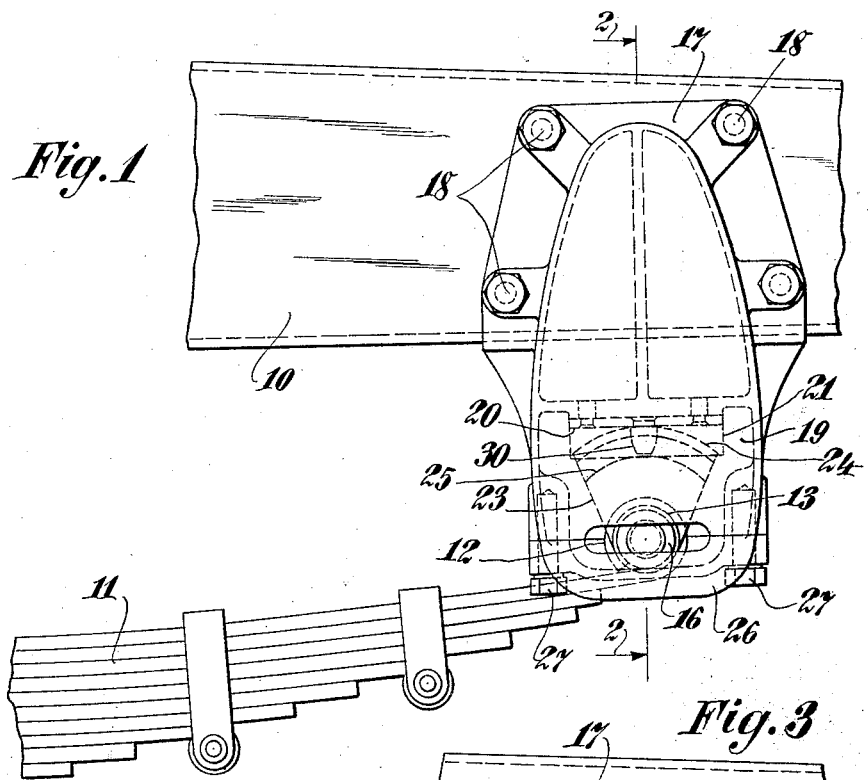
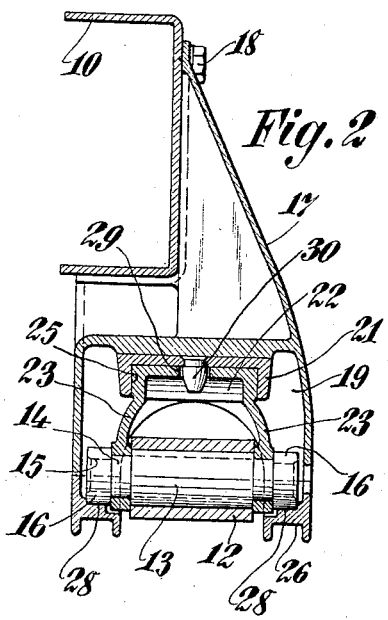
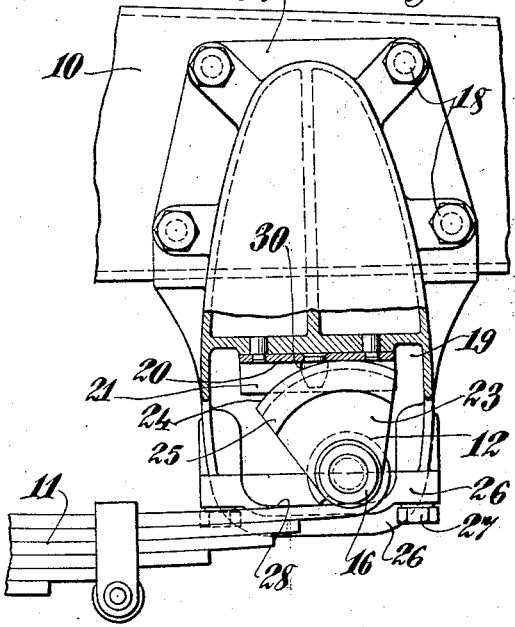
INVENTOR
John W. Heiney,
BY Redding, Greeley, O'Shea & Campbell
HIS ATTORNEYS Jan. 3, 1933.  J. W. HEINEY  1,892,668
ROLLING SPRING SHACKLE
Filed Aug. 26, 1931  2 Sheets-Sheet 2

INVENTOR
John W. Heiney,
BY Redding, Greeley, O'Shea & Campbell
HIS ATTORNEYS

Patented Jan. 3, 1933

1,892,668

UNITED STATES PATENT OFFICE

JOHN W. HEINEY, OF ALLENTOWN, PENNSYLVANIA, ASSIGNOR TO INTERNATIONAL MOTOR COMPANY, OF NEW YORK, N. Y., A CORPORATION OF DELAWARE

ROLLING SPRING SHACKLE

Application filed August 26, 1931. Serial No. 559,431.

The present invention relates to spring shackles for motor vehicles, and embodies, more specifically, an improved form of shackle connection between a spring and motor vehicle frame wherein provision is made for rolling contact between certain of the elements.

Many previous attempts have been made to provide an efficient shackle connection between the spring and frame of a motor vehicle, wherein relative movement takes place through rolling contact between certain of the connecting elements. All of these designs have been found to be impractical by reason of the tendency of the rolling surfaces to become slightly flattened, after the presence of which condition, sliding, rather than rolling, takes place. The present invention, however, has proved entirely satisfactory and successful, and the surfaces have been found to preserve their original character, whereby pure rolling contact takes place between the connecting elements, in addition to the effective anchoring of the spring against end thrust and side motion or twisting.

An object of the invention, accordingly, is to provide an improved shackle connection between the spring and frame of a motor vehicle wherein the connecting elements move relatively under rolling contact.

A further object of the invention is to provide a connection of the above character wherein rolling contact takes place between certain of the connecting elements, additional means being provided to anchor the spring against end thrust and side motion or twisting.

A further object of the invention is to provide a connection of the above character wherein pure rolling contact takes place, regardless of the condition of wear of the elements.

Further objects, not specifically enumerated above, will be apparent as the invention is explained in greater detail in connection with the accompanying drawings, wherein:

Figure 1 is a segmental view in side elevation showing a shackle connection constructed in accordance with the present invention.

Figure 2 is a view in section taken on line 2—2 of Figure 1 and looking in the direction of the arrows.

Figure 3 is a view in side elevation showing the elements of Figure 1 displaced relatively to indicate the manner in which the connection functions in operation.

Figure 4:
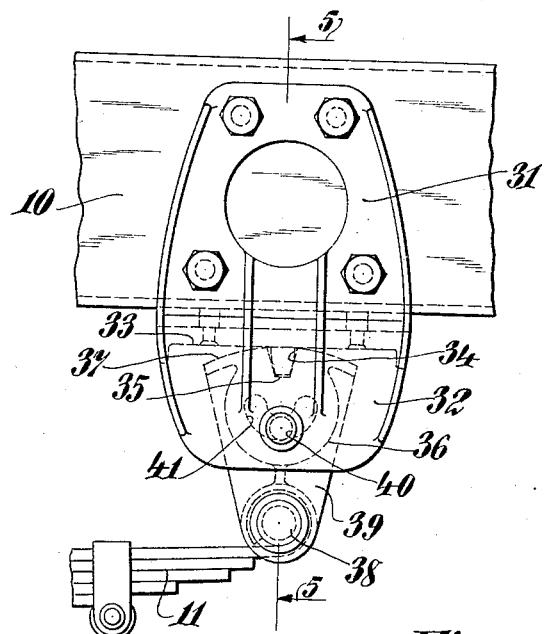
Figure 4 is a view in side elevation showing a modified form of the invention.

Referring to the construction shown in Figures 1, 2 and 3, the frame of a motor vehicle is indicated at 10, and a spring to be connected thereto is shown at 11. The end of the spring is formed with an eye 12, in accordance with usual practice, and the eye receives a shackle bolt 13. The ends of the shackle bolt are provided with bearings 14 and extensions 15, upon which rollers 16 are journaled.

Upon frame 10 a bracket 17 is secured by means of bolts 18. A bracket is formed with a housing 19 having a horizontal bearing surface 20 and downwardly extending brackets 21.

Upon the bearings 14, a shackle connection 22 is journaled, the connection being formed with spaced arms 23 which are journaled upon the bearings 14. The upper surface 24 of the shackle connection 32 is formed with a curvature about the center of the spring eye 12 and axis of the shackle bolt 13 and thus rolls upon the bearing surface 20. Lateral surfaces 25, formed upon the connection 22, are received between the flanges 21 and thus serve as an effective bearing against side sway and other lateral forces. These cooperating surfaces further provide a bearing against twisting of the spring with respect to the frame.

A cover 26 is secured to the housing 19 by means of bolts 27 and is apertured to receive the end of the spring 11. Horizontal bearing surfaces 28 are formed on the cover 26 and are engaged by the rollers 16, whereby the rollers roll over such surfaces during movement of the spring with respect to the frame. These surfaces prevent the separation of the shackle connection from the housing 19 and preserve an effective joint.

The connection 22 may be formed with a recess 29 which is adapted to be engaged by a lug 30 which projects downwardly from the surface 20. In this fashion the connection is preserved in a desired relation with respect to the frame.

Figure 6:
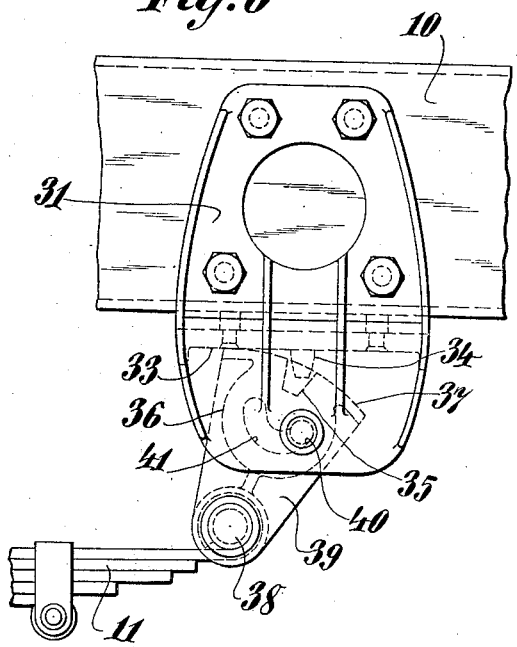
Figure 6 is a view similar to Figure 4, showing the manner in which the connection functions upon relative movement of the spring with respect to the frame.
Figure 5:
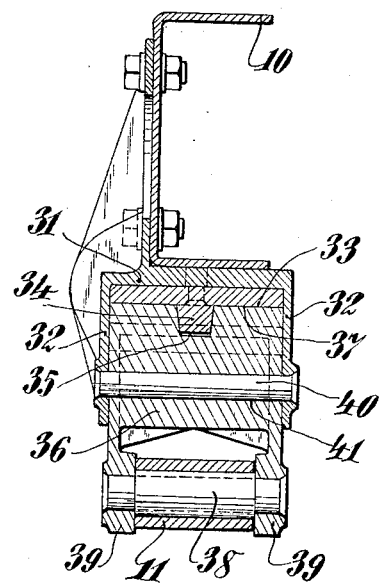
Figure 5 is a view in section taken on line 5—5 of Figure 4 and looking in the direction of the arrows.

With reference to the construction shown in Figures 4, 5 and 6, a bracket 31 is formed with spaced side members 32 and a horizontal bearing surface 33. A downwardly projecting lug 34 may be provided to engage a cooperating recess 35 formed in a shackle connection 36. The upper surface 37 of the connection 36 is formed with a curvature about the axis of a shackle pin 38 which is received in the spring eye, as will be readily apparent. Downwardly extending arms 39, formed on the shackle connection 36, are journaled upon the shackle bolt 38 and the connection receives a pin 40 which is secured between the spaced portions 32 of the bracket 31. An arcuate groove 41 is formed in the connection 36 to receive the pin 40 and permit rolling contact of the surface 37 upon the surface 33, at the same time preventing separation of the elements upon a too rapid movement of the spring away from the frame.

It will be seen that both of the constructions described above effectively anchor the spring against end thrust and side motion or twisting. The elements are of such character as to preserve pure rolling contact at all times and under all conditions, and there is no possibility for sliding contact to take place. While the invention has been described with specific reference to the constructions shown in the accompanying drawings, it is not to be limited save as defined in the appended claims.

I claim as my invention:

1. A connection between a vehicle spring and frame comprising a bracket on the frame, a bearing surface on the bracket, a shackle bolt on the spring, a shackle connection journaled on the bolt and formed with a curved surface about the axis of the bolt to engage the bearing surface, spaced depending flanges on the bearing surface parallel to the spring, bearing surfaces on the connection cooperating with the flanges to prevent twisting of the connection, and means to secure the connection to the bracket.

2. A connection between a vehicle spring and frame comprising a bracket on the frame, a bearing surface on the bracket, a shackle bolt on the spring, a shackle connection journaled on the bolt and formed with a curved surface about the axis of the bolt to engage the bearing surface, spaced depending flanges on the bearing surface parallel to the spring, bearing surfaces on the connection cooperating with the flanges to prevent twisting of the connection, and a pin between the spaced flanges and received in an arcuate slot in the connection to prevent separation of the elements.

3. A connection between a vehicle spring and frame comprising a bracket on the frame, a bearing surface on the bracket, a shackle bolt on the spring, a shackle connection journaled on the bolt and formed with a curved surface, spaced depending flanges on the bearing surface parallel to the spring, bearing surfaces on the connection cooperating with the flanges to prevent twisting of the connection, means to secure the connection to the bracket, and interengaging means on the bearing surface and curved surface.

4. A connection between a vehicle spring and frame comprising a bracket on the frame, a bearing surface on the bracket, a shackle bolt on the spring, a shackle connection journaled on the bolt and formed with a curved surface about the axis of the bolt to engage the bearing surface, parallel track surfaces on the bracket, and rollers on the shackle bolt engaging the tracks.

5. A connection between a vehicle spring and frame comprising a bracket on the frame, a bearing surface on the bracket, a shackle bolt on the spring, a shackle connection journaled on the bolt and formed with a curved surface about the axis of the bolt to engage the bearing surface, spaced depending flanges on the bearing surface parallel to the spring, bearing surfaces on the connection cooperating with the flanges to prevent twisting of the connection, parallel track surfaces on the bracket, and rollers on the shackle bolt engaging the tracks.

This specification signed this 20 day of August A. D. 1931.

JOHN W. HEINEY.